United States Patent
Bridgelall (10) Patent No.: US 7,385,476 B2
(45) Date of Patent: Jun. 10, 2008

(54) METHOD AND SYSTEM FOR COMMUNICATING DATA TO A WIRELESS ACCESS POINT

(75) Inventor: Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 371 days.

(21) Appl. No.: 10/799,064

(22) Filed: Mar. 11, 2004

(65) Prior Publication Data

US 2005/0200456 A1 Sep. 15, 2005

(51) Int. Cl.
*H04Q 7/24* (2006.01)
*H04L 12/28* (2006.01)

(52) U.S. Cl. ................. 340/10.1; 370/338; 455/41.2
(58) Field of Classification Search ............. 340/10.1, 340/10.2, 572.1; 370/338; 455/41.2
See application file for complete search history.

(56) References Cited

U.S. PATENT DOCUMENTS

| | | | |
|---|---|---|---|
| 5,682,142 A * | 10/1997 | Loosmore et al. | 340/572.1 |
| 5,914,671 A * | 6/1999 | Tuttle | 340/10.42 |
| 5,960,344 A * | 9/1999 | Mahany | 455/432.2 |
| 6,150,921 A * | 11/2000 | Werb et al. | 340/10.1 |
| 6,246,882 B1 | 6/2001 | Lachance | |
| 6,526,034 B1 * | 2/2003 | Gorsuch | 370/338 |
| 6,892,052 B2 * | 5/2005 | Kotola et al. | 455/41.2 |
| 6,909,705 B1 * | 6/2005 | Lee et al. | 370/338 |
| 2002/0126013 A1 * | 9/2002 | Bridgelall | 340/572.1 |
| 2003/0007473 A1 * | 1/2003 | Strong et al. | 370/338 |
| 2003/0119568 A1 * | 6/2003 | Menard | 455/572 |
| 2004/0039817 A1 * | 2/2004 | Lee et al. | 709/225 |
| 2004/0236967 A1 * | 11/2004 | Korcharz et al. | 713/300 |
| 2005/0113066 A1 * | 5/2005 | Hamberg | 455/411 |

FOREIGN PATENT DOCUMENTS

| | | |
|---|---|---|
| EP | 1 211 630 A2 | 6/2002 |
| EP | 1 211 630 A3 | 7/2002 |
| WO | WO 02/11074 A2 | 2/2002 |
| WO | WO 02/011074 A3 | 2/2002 |
| WO | WO 02/096032 A2 | 11/2002 |
| WO | WO 02/096032 A3 | 11/2002 |
| WOWO | PCT/US05/007715 | 11/2005 |

* cited by examiner

*Primary Examiner*—Edwin C. Holloway, III
(74) *Attorney, Agent, or Firm*—Ingrassia Fisher & Lorenz, P.C.

(57) ABSTRACT

A system for communicating data through a network is disclosed. The system includes at least one access point and at least one mobile unit. The access point includes an access point processor, a wireless transceiver and an RFID transceiver. The wireless transceiver is coupled to the access point processor and the wireless transceiver is configured to receive and transmit data to a wireless device in the wireless local area network. The RFID transceiver is coupled to the access point processor and the RFID transceiver is configured to receive data from at least one mobile unit in the wireless local area network when the wireless transceiver is unavailable. The mobile unit includes a mobile unit processor, a mobile unit wireless transceiver and a mobile unit RFID transceiver. The mobile unit wireless transceiver is coupled to the mobile unit processor and the mobile unit wireless transceiver is configured to receive and transmit data to the access point. The mobile RFID transceiver is coupled to the mobile unit processor and the mobile unit processor is configured to send data to the RFID transceiver of the access point when the wireless transceiver of the access point is unavailable.

31 Claims, 5 Drawing Sheets

METHOD AND SYSTEM FOR COMMUNICATING DATA TO A WIRELESS ACCESS POINT

FIELD OF THE INVENTION

This invention relates to the field of wireless communication and more specifically to a method and system for communicating data to a wireless access point.

BACKGROUND OF THE INVENTION

Wireless methods of communication are becoming increasingly important in many different fields of endeavor. For example, computer users who were once shackled to modems or wired network connections are now able to roam freely as they access networks wirelessly. The demand for wireless access has led to the development of wireless access points. Wireless access points are devices that include one or more wireless transceivers that can communicate with mobile users. Data received from the mobile user can then be sent throughout a network via the access point's network connection, which may be an Ethernet connection to a local area network or a wireless connection to another access point. A network that includes wireless access points is known as a wireless local area network (WLAN).

One example of where WLANs are being used is in warehouses. In a warehouse, different workers may use a host of wireless devices to check inventory and relay that information back to a server computer. In such a warehouse setting, one or more wireless access points may be provided. The wireless access points may be coupled to a computer or local area network such that data received by the access point from a wireless device may be transferred to a wired network.

The wireless access points in a warehouse can also be used for inventory control purposes. This can be accomplished by integrating a radio frequency identification device (RFID) transceiver into the wireless access point. The RFID transceiver can be used to interrogate RFID tags mounted on various items, such as a box, by broadcasting a radio frequency signal. The RFID tag then responds to the interrogation. In one design of an RFID system, the tag responds by back scattering the interrogation signal with a modulation that can carry data back to the RFID receiver. The information received from the tag may include the identity of the object the tag is attached to, information about the object the tag is attached to, the location of the object the tag is attached to, and the like.

In a similar fashion, mobile units in a warehouse setting may also be outfitted with RFID transceivers. This allows the mobile unit to interrogate and receive responses from RFID tags as part of an overall RFID inventory control system.

A drawback of this system is that at certain times an access point may be busy sending or receiving data for one or more users. When the access point is busy, other attempts to send data to the access point via the wireless LAN will be unsuccessful. This leads to inefficiencies in the system. What is needed is a method and system for communicating data to wireless access points.

BRIEF SUMMARY OF THE INVENTION

In one embodiment a system for communicating data through a network is disclosed. The system includes at least one access point and at least one mobile unit. The access point includes an access point processor, a wireless transceiver and a RFID transceiver. The wireless transceiver is coupled to the access point processor and the wireless transceiver is configured to receive and transmit data to a wireless device in the wireless local area network. The RFID transceiver is coupled to the access point processor and the RFID transceiver is configured to receive data from the at least one mobile unit in the wireless local area network when the wireless transceiver is unavailable.

The mobile unit includes a mobile unit processor, a mobile unit wireless transceiver and a mobile unit RFID transceiver. The mobile unit wireless transceiver is coupled to the mobile unit processor and the mobile unit wireless transceiver is configured to receive and transmit data to the access point. The mobile RFID transceiver is coupled to the mobile unit processor and the mobile unit processor is configured to send data to the RFID transceiver of the access point when the wireless transceiver of the access point is unavailable.

In another embodiment, the wireless transceiver of the access point is unavailable when the wireless transceiver of the access point is busy.

In another embodiment, the wireless transceiver of the access point is unavailable when the wireless transceiver of the access point is inoperative.

In another embodiment, the wireless transceiver is unavailable because the data sent by the wireless device is predesignated for reception by the RFID transceiver to reduce demands on the wireless transceiver.

Other independent features and advantages of the present invention will become apparent from the following detailed description, taken in conjunction with the accompanying drawings which illustrate, by way of example, the principles of the invention.

BRIEF DESCRIPTION OF THE DRAWINGS

The present invention will herein be described in conjunction with the following drawings and figures, wherein like numerals denote like elements and wherein.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
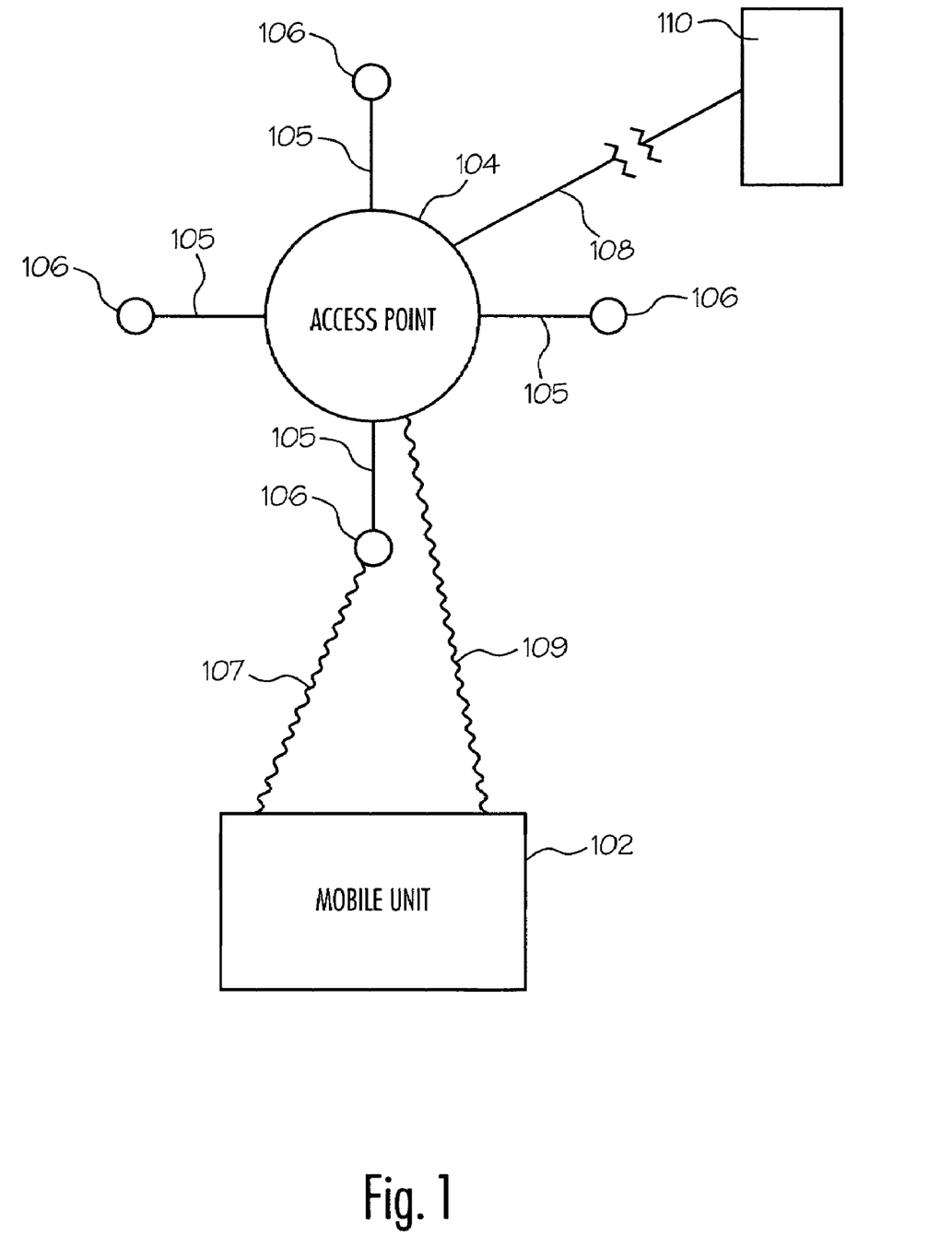
FIG. 1 illustrates a communication system in accordance with the teachings of the present invention.
Figure 2:
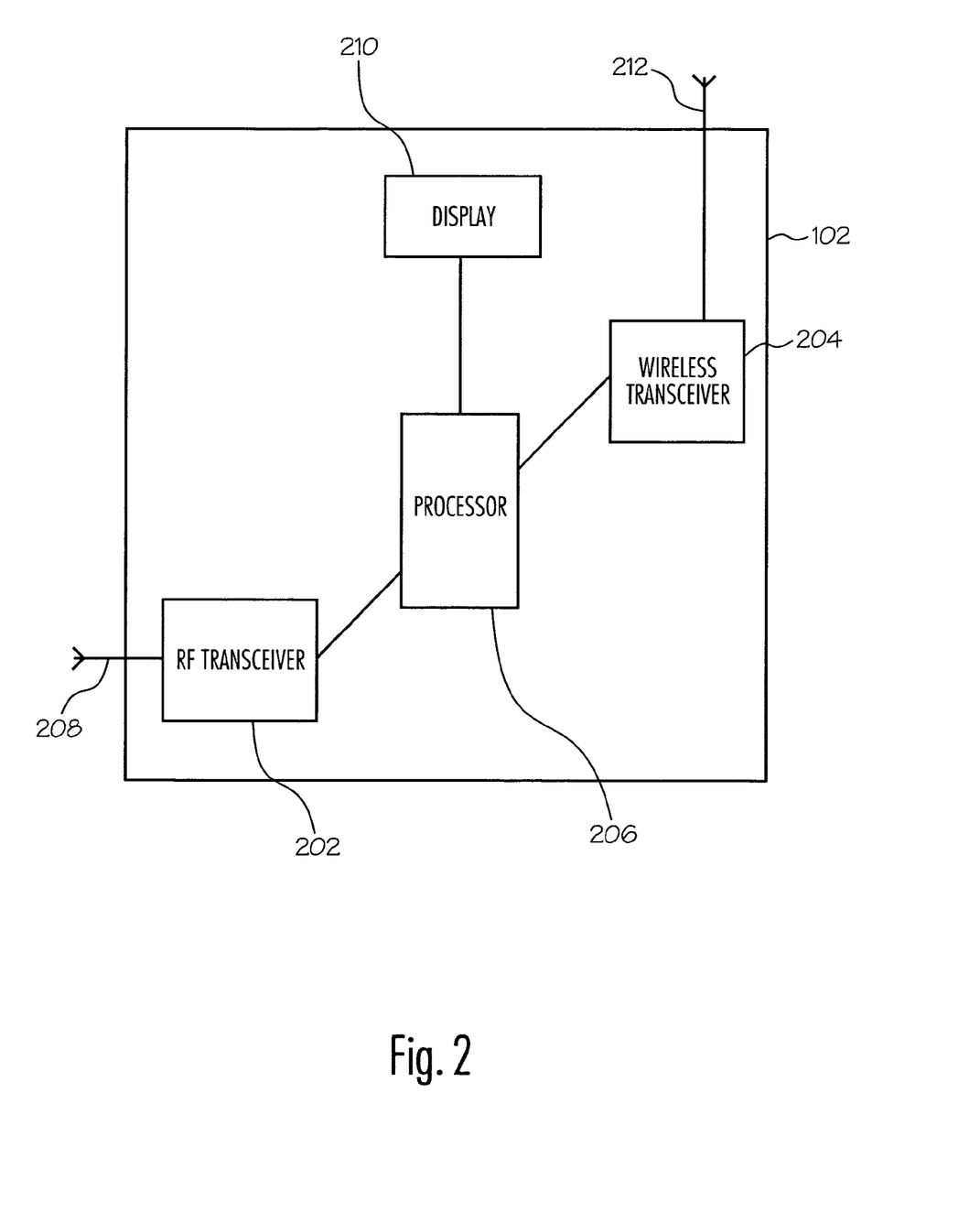
FIG. 2 is a block diagram illustrating an exemplary mobile unit.
Figure 3:
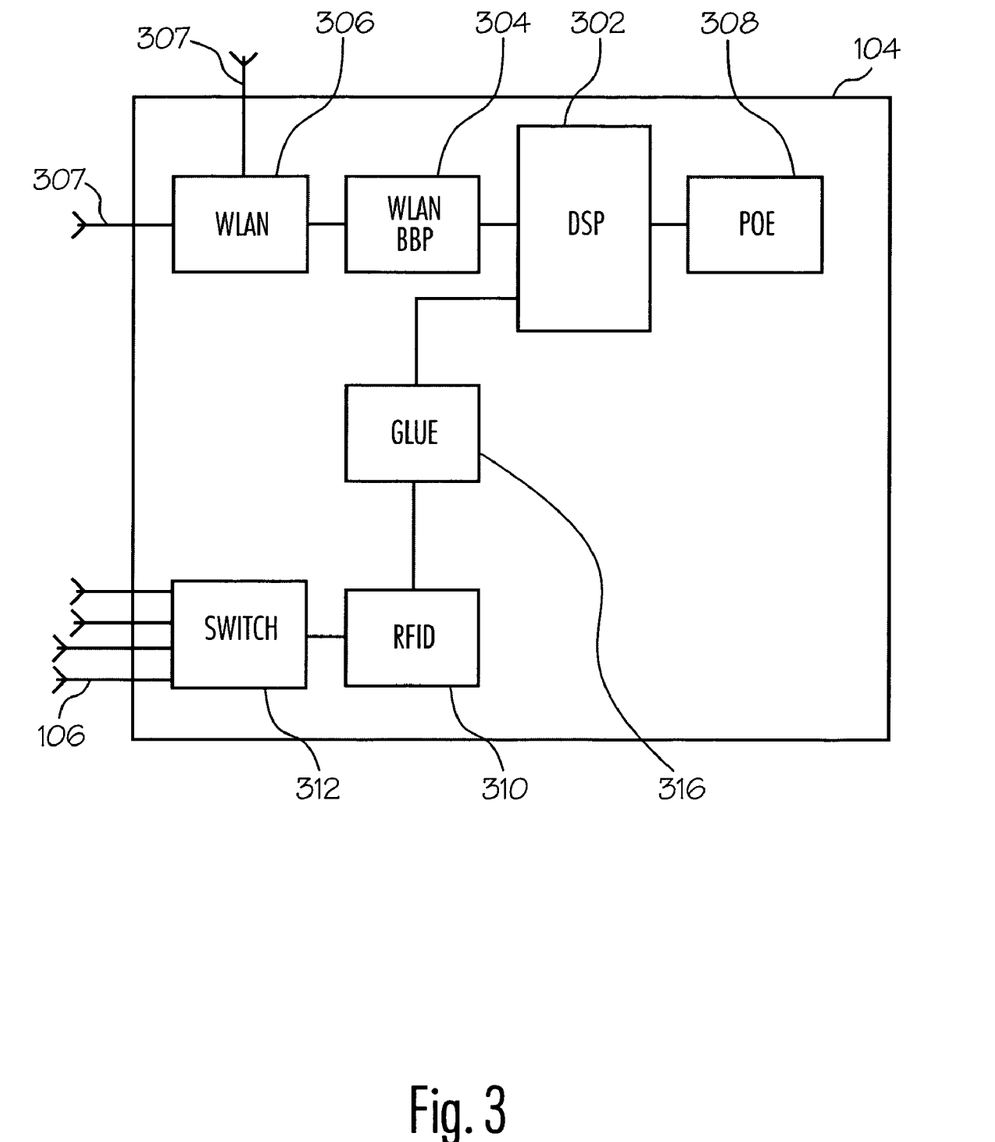
FIG. 3 is a block diagram illustrating an exemplary access point.
Figure 4:
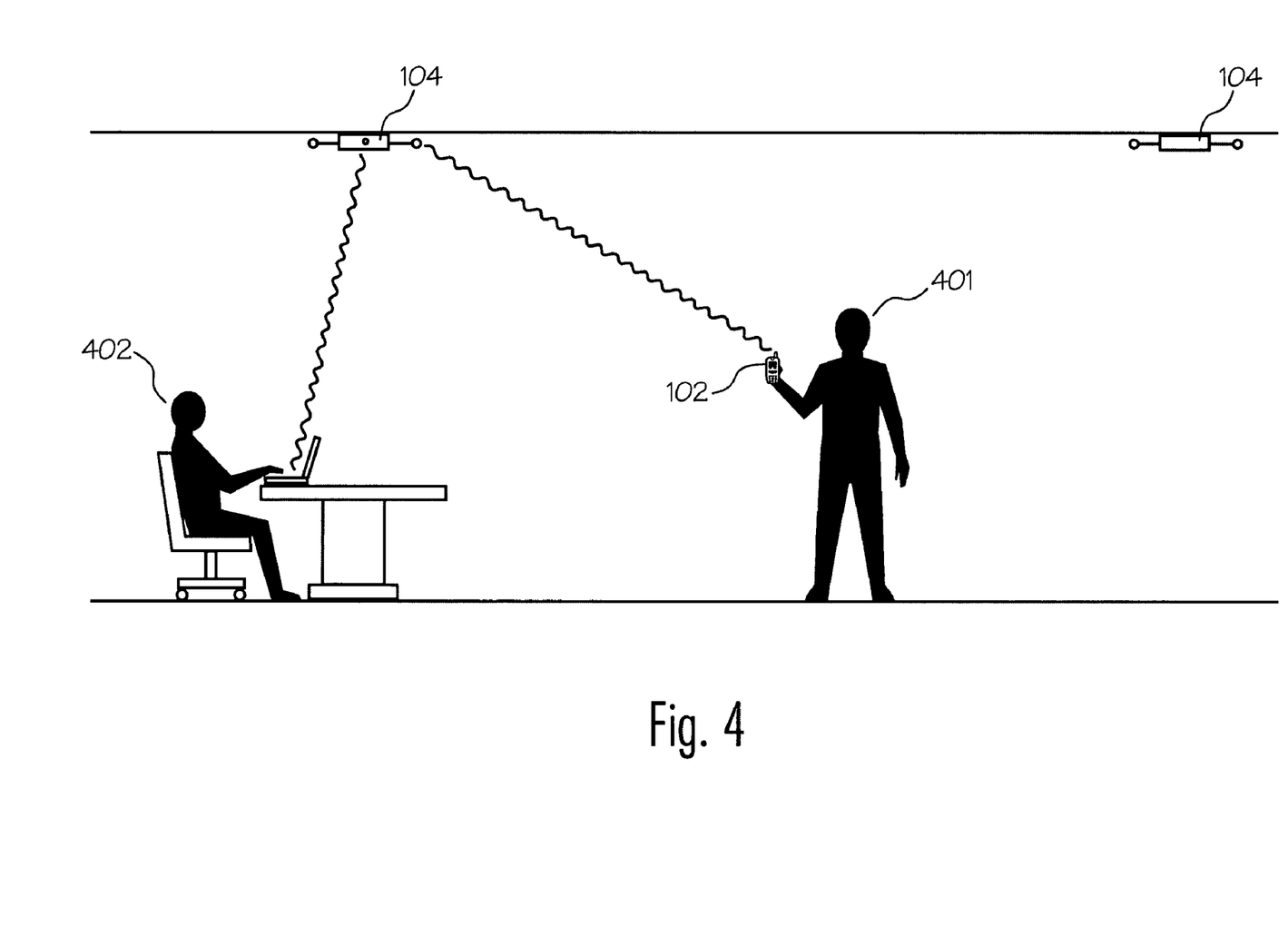
FIG. 4 illustrates an exemplary use of the present invention.

A system 100, in accordance with one embodiment of the invention is illustrated in FIGS. 1-3. As seen in FIG. 1, the system 100 comprises one or more mobile units 102 and one or more access points 104 having one or more RFID antennas 106 coupled, in one embodiment, to access point 104 via a cable 105. In one embodiment, as seen in FIG. 4, multiple access points 104 may be distributed throughout an area, such as a warehouse. The access points 104, in one embodiment, are coupled to a computer 110 via connection 108. Computer 110 may be a standard computer or a computer network or any other device capable of receiving and transmitting data with the access point 104. Connection 108 maybe a wired connection, such as an Ethernet connection or a wireless connection.

Mobile unit 102 is any device capable of wirelessly communicating with one or more access points 104 using either a wireless LAN signal 109 or by using a RFID signal 107. Mobile unit 102 may also gather data as part of an RFID system. In a typical embodiment, the wireless LAN signal 109 is compliant with IEEE standard 802.11 and the RFID signal is compliant with any one of a number of RFID standards as discussed in The RFID Handbook by Klaus Finkenzeller, which is hereby incorporated by reference. Other protocols for both the LAN signal 109 and the RFID signal 107 can be used without departing from the scope of the present invention.

Turning to FIG. 2, mobile unit 102, in one embodiment of the invention comprises a mobile unit RFID transceiver 202 coupled to one or more RFID antennas, a mobile unit wireless transceiver 204, a mobile unit processor 206 coupled to the mobile RFID transceiver 202, the mobile unit wireless transceiver 204 and a display 210. Mobile unit 102 may also include an input device 211, such as a keyboard, touch sensitive display, track ball or any other suitable input device 211.

Mobile unit RFID transceiver 202, in conjunction with one or more mobile unit RFID antennas 208, may interrogate RFID tags and receive responses from the tags. This process is well known in the art. Additionally, mobile unit RFID transceiver 202 may send data to another device with an RFID transceiver, such as access point 104. For example, mobile unit RFID transceiver 202 may send a simulated back scatter signal to the wireless access point 104. This allows mobile unit 102 to send data via the mobile unit RFID transceiver 202 to access point 104 when the access point 104 cannot accept any wireless local area network communications. The inability of access point 104 to receive local area network communications may be because the access point 104 is busy with other wireless local area network communications, because the access point 104 is partially inoperative in that it cannot accept wireless local area network communications, or for some other reason. Several different manufacturers, including Texas Instruments of Plano, Tex., manufacture suitable RFID transceivers and/or wireless RFID readers.

Mobile unit wireless transceiver 204, in conjunction with mobile unit wireless antenna 212, wirelessly receives data from access points 104 and transmits data to access points 104, other mobile units or any other wireless device. Preferably, mobile unit wireless transceiver 204 is compliant with IEEE standard 802.11a. 802.11b or 802.11g, although for the purpose of the present invention any wireless protocol can be used. Wireless transceivers are commercially available from a number of manufacturers, including RF Micro Devices of Greensboro, N.C.

Mobile unit processor 206 may be any commonly available microprocessor such as processors manufactured by Hitachi, MICROCHIP, and AMD. Processor 206 runs processes necessary for the operation of the mobile unit 102. In one exemplary embodiment, mobile unit processor 206 executes routines that allow the mobile unit 102 to determine if the nearest access point 104 is busy. For example, mobile unit processor 206 may execute routines that cause the mobile unit 102 to issue a probe request to the nearest access point 104 to determine if the access point 104 is busy. Also, mobile unit processor 206 may execute routines that cause the mobile unit 102 to conduct a clear channel assessment to see if the access point 104 is busy. Clear channel assessments and probe requests are two of many well known methods to check if a system is busy. If these or any other indication shows that the nearest access point 104 is busy, mobile unit 102 can transfer data using the mobile unit RFID transceiver 202. This is discussed more fully in conjunction with the description for FIG. 4 and FIG. 5.

The display 210 provides visual feedback of the operation of the mobile unit 102. Display 210 can utilize any display technology, but preferably requires a readable, light weight display, such as LCD displays, LED displays, plasma displays and the like, In one embodiment, display 210 is a touch sensitive display.

While mobile unit 102 is typically a device that can be moved from one location to another, whether hand held or otherwise movable, mobile unit 102 may also be a fixed, non moveable unit capable of communicating with access point 104 via either a wireless LAN transceiver or RFID transceiver.

Access point 104 is any device that can receive data and transmit data wirelessly and connects users to other users in a network or to a network. Access point 104 may also serve as a connection point between the wireless LAN and a fixed wired network. For example, in FIG. 1 access point 104 is coupled to a computer network 110 via a connection 108. Typically, each access point 104 may serve multiple users in a defined area. Usually, the access point 104 is able to handle all wireless LAN communications in a given area. However, the access point 104 may become busy, such as when one of the user requests a large amount of information (e.g. streaming video or multiple streams of real-time voice over IP communications packets). In areas where the coverage area of one access point 104 is insufficient, multiple access points 104 can be used. When multiple access points 104 are used, the access points 104 may include protocols that allow the access point 104 to hand off mobile units 102 from one access point 104 to another as the mobile unit 102 moves about.

Access point 104 as illustrated in FIG. 3, comprises a DSP 302, coupled to a wireless LAN baseband chip 304, which is coupled to a WLAN transceiver 306 having one or more wireless LAN antennas 307. DSP 302 is also coupled to a power over Ethernet (POE) controller 308. POE controllers 308 are known in the art and are covered by IEEE standards 802.3a-f. The POE controller 308 couples to a computer or a computer network. While these components are typical components in wireless access points; different, additional or less components can be included in a wireless access point without departing from the scope of the present invention. The access point 104 may also include an RFID transceiver 310, coupled to an antenna switch 312, which couples to one or more RFID antennas 106. The RFID transceiver 310 also couples to the DSP 302 via glue logic 316. Glue logic 316 is any device or computer code that allows the RFID transceiver 310 to connect to and communicate with the wireless LAN portion of the access point 104. Via glue logic 316, data sent to the RFID transceiver 310 by a mobile unit 102 can be sent to and manipulated by the DSP 302.

Wireless LAN transceiver 306 in conjunction with one or more wireless LAN antennas 307, is any device capable of communicating wirelessly with other wireless devices. Wireless LAN transceiver 306 may receive data from and transmit data to other wireless devices such as mobile unit 102. Wireless LAN transceiver may be compliant with wireless standards such as IEEE standards 802.11a, 802.11b and 802.11g, although the present invention can utilize any wireless protocol. As discussed previously, wireless LAN transceivers are known in the art and commercially available.

Wireless baseband chip 304 converts received wireless signals to a digital signal so DSP 302 can manipulate the data received by the wireless LAN transceiver 306. Also, the wireless baseband chip 304 converts digital signals generated by the DSP 302 to a signal that can be presented to the wireless LAN antenna 307. DSP 302 is any processor capable of receiving and manipulating data. For example, DSP 302 may convert the digitized data to packet format for transmission over a network. DSP 302 may also receive data from RFID transceiver 310 and convert that data to packet format. DSPs are commonly available from many manufacturers such as Texas Instruments of Plano, Tex.

Power over Ethernet controller 308 is any device that can handle the transmission and reception of data packets over a wired network and provide power to the circuitry of the access point 104. Power over Ethernet controllers 308 are available from manufacturers such as NETGEAR of South Hackensack, N.J. Alternatively, power can be provided to the access point 104 via any conventional means such as batteries a direct connection to a power source, and the like.

RFID transceiver 310 is any device that can broadcast interrogations to RFID tags and receive responses to the interrogations. RFID transceiver 310 may also help determine the location of an object with an associated a RFID tag.

Antenna switch 312 is any device that is capable of switching RFID transceiver 310 between the one or more RFID antennas 106. By providing multiple RFID antennas 106, coverage of the RFID transceiver 310 can be increased. As shown in FIG. 3, four different RFID antennas 106 are connected to access point 104. By switching between one of the four RFID antennas 106, different RFID antennas 106 can be used to send an interrogation to a RFID tag. If the same interrogation is conducted with three or more antennas, the RFID transceiver 310 can be used to locate RFID tags by well-known method such as triangulation.

As seen in FIG. 1 and FIG. 3, RFID antennas 106 are coupled to access point 104 via the cable 105, such as a coaxial cable. This allows for RFID antennas 106 to be placed remotely from the access point 104. In another exemplary embodiment, the RFID antennas 106 can be placed outside the coverage area of the wireless LAN transceiver 306 to allow a mobile user to access a remote access point via the RFID transceiver 310 even if it can not access the access point via the wireless LAN transceiver 306. This increases the density of the RFID antennas in a given area. In yet another exemplary embodiment, RFID antennas can be collocated with the access point 104.

FIG. 4 illustrates an exemplary use of the present invention. FIG. 4 illustrates mobile unit 102 operating inside a structure having at least one access point 104 mounted to the ceiling. However, other mounting can be utilized in accordance with the present invention. Each access point 104, in this example, has four RFID antennas coupled to it, although only two are visible in FIG. 4. The access point 104 can be connected to a wired network via connection 108.

Mobile unit 102, which is operated by first user 401, has data that it wants to communicate via access point 104 to the wired network 110. However, at the time the communication is ready for transferring from the mobile unit 102, the WLAN transceiver 306 of access point 104 is busy. For example, the WLAN transceiver 306 of access point 104 may already be wirelessly communicating with a second user 402. The second users 402 demands on the access point 104 are such that the access point 104 is unable to receive data from the mobile unit 102 at this time. As discussed previously, mobile unit 102 may determine that the access point 104 is busy by issuing a probe request, by performing a clear channel assessment or by performing some other test to see if access point 104 is busy.

Since the WLAN transceiver 306 of the access point 104 is busy, mobile unit 102 sends the information through the mobile unit RFID transceiver 202. The mobile unit RFID transceiver 202 of the mobile unit 102 will, in one embodiment of the present invention, send the data in a signal form that is similar to what an RFID tag would send in response to an interrogation. For example, the mobile unit RFID transceiver 202 sends a transmission similar in form to a RFID tag response (e.g. a simulated backscattered signal) to the access point 104 via the RFID antenna 106 and RFID transceiver 310 of the access point 104. While simulated backscattered signals can be used, any format or protocol that is mutually compatible between the mobile unit RFID transceiver 202 and the RFID transceiver 310 of the access port can be used. The data can then be sent through the connection 108 of the access point 104 and to a computer network 110 or similar device. By communicating data via the RFID transceivers of the access point 104 and mobile unit 102, the access point 104 is able to handle more data then if just the mobile unit wireless transceiver 204 was used. Both the first user 401 and the second user 402 are able to communicate effectively.

Figure 5:
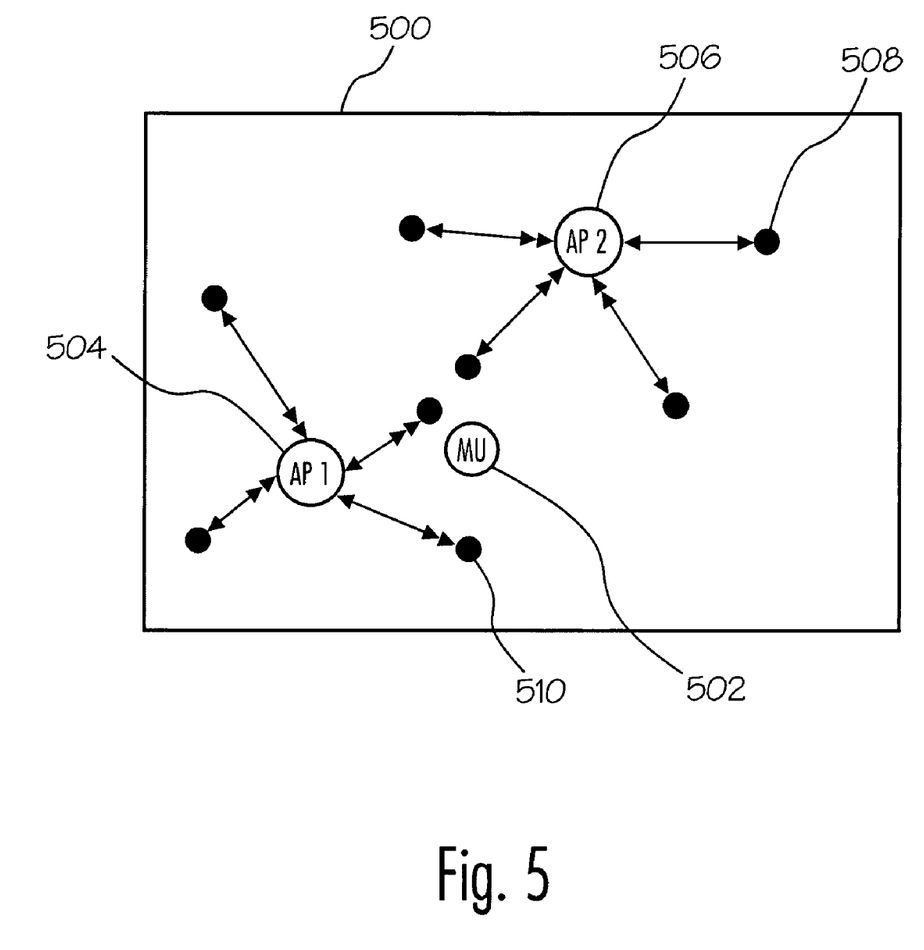
FIG. 5 illustrates an exemplary use of the present invention where a user is communicating with a remote access point via an extended antenna.

In one exemplary embodiment, the WLAN transceiver 306 converts received modulated bits and assembles them into compressed packets before transferring them to the DSP 302. The DSP 302 can interleave similar bit packets from the data received by the RFID transceiver 310. DSP 302 preferably has enough processing capability to take multiple data streams and send the data to the common wired network. However, the DSP 302 processing ability may also become a bottleneck in some situations, such as when the demands are very high from both the wired network side and the wireless transceiver side. When this happens, a second access point that has a free processor can be used. For example, as illustrated in FIG. 5, which is an overhead view of a mobile user 502 in a wireless LAN environment, user 502 is within range of a first access point 504 but is outside the WLAN range of second access point 506. That is, the user 502 can communicate with first access point 504 via a WLAN connection but can not communicate with second access point 506 via a WLAN connection. However, second access point 506 has at least one second access point RFID antenna 508 that is in the range of the user's 502 ability to send an RFID transmission. User 502 is also within the range of at least one of first access point RFID antenna 510. In this exemplary embodiment, if the first access point 504 is busy, for example, because the processor is busy, but the second access point's 506 processor is not busy, the user 502 can send data to the second access point RFID antenna 508 of second access point 506. The data can then be processed by the second access point 506.

The above embodiments disclosed that the mobile unit 102 can communicate with the access point 104 via the RFID transceivers of each device when the WLAN transceiver 306 is busy (unavailable). However, unavailable in the context of the present invention is a broader concept and includes any situation when the WLAN transceiver is unavailable, such as failure of the WLAN transceiver 306 or lack of capacity for the DSP 302. Further, in one embodiment of the present invention, unavailable also includes the situation where the mobile RFID transceiver 202 always communicates certain predetermined data to the RFID transceiver 310 of the access port 104. For example, the RFID transceiver of the access point 104 can be configured to always receive certain transmissions such as slow data rate updates, configurations, status, device monitoring, device management, and the like. This frees up bandwidth of the WLAN transceiver. By providing a secondary channel of communication between the mobile unit 102 and the access point 104, the WLAN transceiver of the access point can be free for other transmissions, increasing the overall capacity of the system 100.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An access point for facilitating communication with one or more wireless devices in a wireless local area network comprising:
   an access point processor;
   a wireless transceiver having at least one wireless antenna, the wireless transceiver coupled to the access point processor, the wireless transceiver configured to receive and transmit data to at least one of the one or more wireless devices in the wireless local area network; and
   a RFID transceiver having at least one RFID antenna, the RFID transceiver coupled to the access point processor, the RFID transceiver configured to receive data from at least one of the one or more wireless devices in the wireless local area network when the wireless transceiver is unavailable,
   wherein the RFID transceiver is further configured to receive selected, predesignated data without interrogating the mobile device to reduce demand on the wireless transceiver,
   wherein the at least one RFID antenna includes two or more RFID antennas coupled to the RFID transceiver via an antenna switch configured to connect the RFID transceiver with the two or more RFID antennas, the two or more RFID antennas including at least one first RFID antenna located remotely from the access point and coupled to the to the access point by a coaxial cable.

2. The access point of claim 1 wherein the access point is powered through an Ethernet connection.

3. The access point of claim 1 wherein the access point is coupled to a wired local area network.

4. The access point of claim 1 wherein the wireless device comprises an RFID reader.

5. The access point of claim 1 wherein the wireless transceiver is unavailable because the wireless transceiver is busy handling other data.

6. The access point of claim 1 wherein the wireless transceiver is unavailable because the wireless transceiver is inoperative.

7. The access point of claim 1 wherein the two or more RFID antennas include at least one second RFID antenna collocated with the access point.

8. The access point of claim 1 wherein the access point processor converts data received from the RFID transceiver or from the wireless transceiver and converts the data into proper format for transmission to a computer network.

9. A system for communicating data through a network comprising:
   an access point comprising:
     an access point processor;
     a wireless transceiver having at least one wireless antenna, the wireless transceiver coupled to the access point processor, the wireless transceiver configured to receive and transmit data to a wireless device in a wireless local area network; and
     a RFID transceiver having at least one RFID antenna, the RFID transceiver coupled to the access point processor, the RFID transceiver configured to receive data from the wireless device in the wireless local area network when the wireless transceiver is unavailable;
   wherein the RFID transceiver is further configured to receive selected, predesignated data without interrogating the mobile device to reduce demand on the wireless transceiver; and
   a mobile unit comprising:
     a mobile unit processor;
     a mobile unit wireless transceiver having at least one mobile unit transceiver antenna, the mobile unit transceiver coupled to the mobile unit processor, the mobile unit wireless transceiver configured to receive and transmit data to the access point;
     a mobile RFID transceiver having at least one mobile RFID transceiver antenna, the mobile RFID transceiver coupled to the mobile unit processor, the mobile unit processor configured to send data to the RFID transceiver of the access point when the wireless transceiver of the access point is unavailable; and
   wherein the mobile unit wireless transceiver is configured to send data to a first access point and the mobile RFID transceiver is configured to send data to a second access point.

10. The system of claim 9 wherein the access point is powered through an Ethernet connection.

11. The system of claim 9 wherein the access point is coupled to a wired local area network.

12. The system of claim 9 wherein the wireless transceiver is unavailable because the wireless transceiver is busy handling other traffic.

13. The system of claim 9 wherein the wireless transceiver is unavailable because the wireless transceiver is inoperative.

14. The system of claim 9 wherein the wireless transceiver is unavailable because the data sent by the wireless device is predesignated for reception by the RFID transceiver to reduce demands on the wireless transceiver.

15. The system of claim 9 further comprising two or more RFID antennas coupled to the RFID transceiver via an antenna switch configured to connect the RFID transceiver with one of the two or more RFID antennas.

16. The system of claim 15 wherein each of the two or more RFID antennas are coupled to the access point by a coaxial cable.

17. The system of claim 16 wherein the RFID antennas are located remotely from the access point.

18. The system of claim 15 wherein the RFID antennas are collocated with the access point.

19. The system of claim 9 wherein the access point processor converts data received from the RFID transceiver or from the wireless transceiver and converts the data into proper format for transmission to a computer network.

20. The system of claim 9 wherein the access point is configured to interrogate RFID tags placed on objects.

21. The system of claim 9 wherein the mobile unit is configured to be used as a RFID reader.

22. The system of claim 9 wherein the mobile unit processor executes computer code to initiate a check to determine if the wireless transceiver of the access point is unavailable.

23. The system of claim 9 further comprising a second access point having a second RFID transceiver coupled to one or more RFID antennas and a second wireless transceiver, the second wireless transceiver outside of the range of the mobile unit wireless transceiver and at least one of the one or more RFID antennas within the range of the mobile unit RFID antenna.

24. A mobile unit for use in a wireless communication network comprising:
 a mobile unit processor;
 a mobile unit wireless transceiver coupled to the mobile unit processor, the mobile unit wireless transceiver configured to receive and transmit data to a wireless transceiver of an access point;
 a mobile RFID transceiver coupled to the mobile unit processor, the mobile unit processor configured to send data to the RFID transceiver of the access point when the wireless transceiver of the access point is unavailable; and
 wherein the mobile unit wireless transceiver is configured to send data to a first access point and the mobile RFID transceiver is configured to send data to a second access point;
 wherein the RFID transceiver is further configured to receive selected, predesignated data without interrogating the mobile device to reduce demand on the wireless transceiver.

25. The mobile unit of claim 24 wherein the mobile unit is configured to operate as a RFID reader.

26. The mobile unit of claim 24 wherein the mobile unit processor is operable to initiate a check to determine if the wireless transceiver of the access point is unavailable.

27. The mobile unit of claim 24 wherein the wireless transceiver is unavailable because the wireless transceiver is busy.

28. The mobile unit of claim 24 wherein the wireless transceiver is unavailable because the wireless transceiver is inoperative.

29. The mobile unit of claim 24 wherein the wireless transceiver is unavailable because the data sent by the wireless device is designated for reception by the RFID transceiver to reduce demands on the wireless transceiver.

30. The access point of claim 1, wherein the at least one first RFID antenna is positioned outside of a range of the at least one wireless antenna of the wireless transceiver.

31. The access point of claim 1, wherein the predesignated data includes at least one of slow data rate updates, configurations, status, device monitoring, and data management.

* * * * *

UNITED STATES PATENT AND TRADEMARK OFFICE
CERTIFICATE OF CORRECTION

PATENT NO.         : 7,385,476 B2                                                         Page 1 of 1
APPLICATION NO.    : 10/799064
DATED              : June 10, 2008
INVENTOR(S)        : Bridgelall It is certified that error appears in the above-identified patent and that said Letters Patent is hereby corrected as shown below:

On the Cover Page, item (56), under "FOREIGN PATENT DOCUMENTS", in Column 2, Line 7, delete "WOWO" and insert -- WO --, therefor.

In Column 3, Line 55, delete "802.11a." and insert -- 802.11a, --, therefor.

In Column 7, Line 57, in Claim 1, after "coupled" delete "to the".

Signed and Sealed this
Fourth Day of October, 2011

David J. Kappos
*Director of the United States Patent and Trademark Office*